(12) United States Patent
Moser et al.

(10) Patent No.: US 7,127,347 B2
(45) Date of Patent: Oct. 24, 2006

(54) METHOD AND DEVICE FOR OPERATING A COMBUSTION ENGINE

(75) Inventors: Eduard Moser, Ludwigsburg (DE); Wolf Edelmann, Stuttgart-Feuerbach (DE); Prasanta Sarkar, Paraganas West Bengal (IN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/200,793

(22) Filed: Aug. 9, 2005

(65) Prior Publication Data
US 2006/0080028 A1    Apr. 13, 2006

(30) Foreign Application Priority Data
Aug. 24, 2004   (DE)   .................. 10 2004 040 924

(51) Int. Cl.
*G06F 17/00* (2006.01)
(52) U.S. Cl. ...................................... 701/114; 73/118.2
(58) Field of Classification Search ................ 701/114, 701/110, 102; 73/118.2
See application file for complete search history.

(56) References Cited

U.S. PATENT DOCUMENTS 4,903,649 A  *  2/1990  Staerzl ...................... 73/118.2

* cited by examiner

*Primary Examiner*—Hieu T. Vo
(74) *Attorney, Agent, or Firm*—Kenyon & Kenyon LLP

(57) ABSTRACT

A method and a device for operating a combustion engine allow a plausibility check of two pressure sensors in a mass-flow line of the combustion engine in any operating range of the combustion engine. At least one component effecting a pressure drop is provided in the mass-flow line, and a first pressure is measured upstream from the at least one component with the aid of a first pressure sensor, and a second pressure is measured downstream from the at least one component with the aid of a second pressure sensor. The first pressure sensor and the second pressure sensor are checked for plausibility as a function of at least one modeled variable characterizing at least one pressure drop in the mass-flow line between the first pressure sensor and the second pressure sensor.

16 Claims, 2 Drawing Sheets

METHOD AND DEVICE FOR OPERATING A COMBUSTION ENGINE

FIELD OF THE INVENTION

The present invention relates to a method and a device for operating a combustion engine having a mass-flow line and at least one component effecting a pressure drop in the mass-flow line.

BACKGROUND INFORMATION

Methods for operating a combustion engine which has a mass-flow line in the form of an exhaust branch and in which at least one component effecting a pressure drop is arranged in the exhaust branch, e.g., a turbine of an exhaust turbocharger, and/or a catalytic converter, are already known. In this context, it is also known that a first pressure can be measured with the aid of a first pressure sensor upstream from the turbine, and a second pressure in the exhaust branch can be measured with the aid of a second pressure sensor downstream from the turbine or downstream from the catalytic converter.

Currently, only limited measures are known to monitor the two pressure sensors in the exhaust branch. At very low engine speeds, or when the engine is turned off, the sensor values of the two pressure sensors are easy to compare with one another since the pressure differential between the first pressure sensor and the second pressure sensor is negligible. For other operating points, e.g., at greater rotational speeds, there are rough estimation methods for the monitoring of the pressure sensors which, however, do not consider the actual loading of a particle filter in the exhaust branch, in particular.

SUMMARY OF THE INVENTION

The method and the device according to the present invention for operating a combustion engine provide the advantage that the first pressure sensor and the second pressure sensor are checked for plausibility as a function of at least one modeled variable that characterizes at least one pressure drop in the mass-flow line between the first pressure sensor and the second pressure sensor. In contrast to the conventional monitoring arrangements, this plausibility check in accordance with the present invention also allows the detection of faulty pipe-work of the exhaust branch, leaks in the exhaust branch, as well as sensor drift. In addition, the plausibility check according to the present invention takes the actual loading of a particle filter in the exhaust branch into account. Furthermore, the plausibility check of the present invention is very precise even for operating points with higher engine speeds, and thus provides a very precise check in a generally larger operating range of the combustion engine.

In accordance with an example embodiment of the present invention, a first value for a pressure differential between the first pressure sensor and the second pressure sensor in the mass-flow line is formed from the difference between the first pressure and the second pressure; a second value for this pressure differential is generated as a function of the at least one modeled variable characterizing at least one pressure drop in the mass-flow line between the first pressure sensor and the second pressure sensor; and the first value for the pressure differential is compared to the second value for the pressure differential and an error is detected if the first value for the pressure differential differs from the second value for the pressure differential by more than a first predefined value. This allows an especially uncomplicated plausibility check of the two pressure sensors via the pressure differential existing between them. Furthermore, an error in the mass-flow line between the first pressure sensor and the second pressure sensor, e.g., a faulty pipe-work or a leak, is able to be detected in an especially simple and reliable manner. In addition, the detection of undesired sensor drift does not require a separate plausibility check of each pressure sensor, but is realizable without much effort by the one-time plausibility check of the pressure differential.

In accordance with another example embodiment of the present invention, a first value for a third pressure in the mass-flow line between the first pressure sensor and the second pressure sensor is ascertained on the basis of the first pressure and a first modeled variable that characterizes a first pressure drop in the mass-flow line between the first pressure sensor and the second pressure sensor; a second value for the third pressure in the mass-flow line between the first pressure sensor and the second pressure sensor is ascertained on the basis of the second pressure and a second modeled variable that characterizes a second pressure drop in the mass-flow line between the first pressure sensor and the second pressure sensor; and the first value for the third pressure is compared with the second value for the third pressure and an error is detected if the first value for the third pressure deviates from the second value for the third pressure by more than a second predefined value. In this way the plausibility check according to the present invention may be carried out in an especially simple and effortless manner in that a pressure in the form of the third pressure is ascertained at a predefined point or in a predefined region of the mass-flow line between the first pressure sensor and the second pressure sensor, for one, on the basis of the first pressure determined by the first pressure sensor and, for another, on the basis of the second pressure ascertained by the second pressure sensor, and both values for this third pressure are then compared to one another. This approach is able to be realized with a minimum of effort.

In accordance with an example embodiment of the present invention, a plurality of components are arranged in the mass-flow line between the first pressure sensor and the second pressure sensor, and the at least one modeled variable that characterizes at least one pressure drop in the mass-flow line between the first pressure sensor and the second pressure sensor is characteristic of a pressure drop above one or a plurality of these components. This makes it possible to easily ascertain the at least one modeled variable characterizing at least one pressure drop in the mass-flow line between the first pressure sensor and the second pressure sensor while taking the characteristics of the corresponding component(s) into account.

In accordance with an example embodiment of the present invention, the first modeled variable characterizing a first pressure drop in the mass-flow line between the first pressure sensor and the second pressure sensor is characteristic of a pressure drop above at least one component between the first pressure sensor and the point in the mass-flow line where the third pressure is ascertained; and the second modeled variable characterizing a second pressure drop in the mass-flow line between the first pressure sensor and the second pressure sensor is characteristic of a pressure drop above at least one component between the second pressure sensor and the point of the mass-flow line where the third pressure is ascertained. In this way, the first value for the third pressure and the second value for the third pressure are able to be determined in a defined, and thus especially reliable, manner so that the plausibility check according to the present invention is particularly meaningful.

The at least one modeled variable characterizing at least one pressure drop in the mass-flow line between the first pressure sensor and the second pressure sensor may be ascertained in a particularly simple manner by a mathematical model or in a map-controlled manner.

The at least one modeled variable characterizing at least one pressure drop in the mass-flow line between the first pressure sensor and the second pressure sensor may also be ascertained as a function of the operating point. This allows the plausibility check according to the present invention to be implemented for various operating points of the combustion engine and, in particular, not only for an operating range with low engine speeds and/or small injections.

Furthermore, in accordance with the present invention, it may be provided that the plausibility check is carried out only in quasi-stable operating states of the combustion engine. This ensures that the plausibility check is not tainted by the change in performance quantities of the combustion engine.

In accordance with the present invention, it may also be provided that the plausibility check is implemented within a predefined time. Given a suitable input of this time, this ensures that the plausibility check does indeed detect an existing fault in a reliable manner, i.e., that sufficient time will be available for the plausibility check to supply a meaningful result.

DETAILED DESCRIPTION

Figure 1:
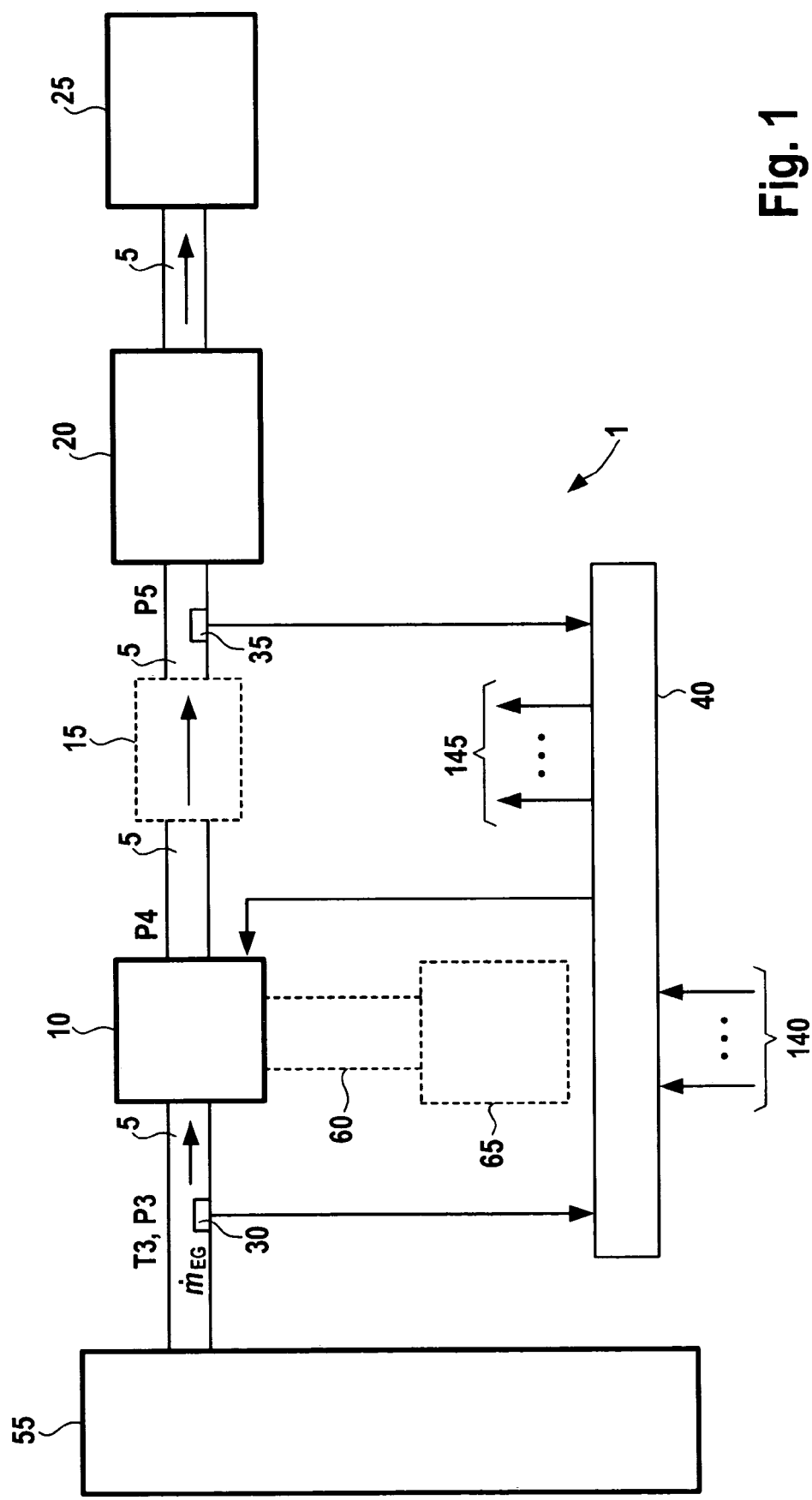
FIG. 1 shows a schematic view of an exhaust branch of a combustion engine.

In FIG. 1, a combustion engine is generally designated by reference numeral 1. In this example, combustion engine 1 is an internal combustion engine such as spark-ignition engine or diesel engine for powering a vehicle. FIG. 1 also shows an exhaust branch 5 of combustion engine 1. This exhaust branch 5 extends from at least one cylinder 55 to a muffler 25. The combustion of air and fuel in the at least one cylinder 55 produces exhaust gas which is expelled from the at least one cylinder 55 into exhaust branch 5 via at least one discharge valve. The resulting exhaust-mass flow is denoted by $\dot{m}_{EG}$ in FIG. 1. The flow direction of the exhaust gas in exhaust branch 5 is indicated by arrows in FIG. 1. Arranged in exhaust branch 5, downstream from the at least one cylinder 55, is a first pressure sensor 30, which measures a first pressure p3 of the exhaust gas at this point of exhaust branch 5 and forwards the measuring result to an engine control 40. Arranged downstream from first pressure sensor 30 in exhaust branch 5 is a first component 10 in the form of a turbine of an exhaust turbocharger, which drives a compressor 65 in an air feed (not shown in FIG. 1) of internal combustion engine 1 via a shaft 60. Turbine 10 is controllable by engine control 40 for the purpose of adjusting a desired charge pressure in the air feed. The desired charge pressure may be achieved, for instance, by setting a suitable opening degree of a bypass valve of a bypass duct circumventing turbine 10. As an alternative, the desired charge pressure may also be realized by appropriate adjustment of the geometry of turbine 10. In the following discussion, it is to be assumed (by way of example) that engine control 40 adjusts the desired charge pressure by a corresponding variation of the geometry of turbine 10. Optionally, a catalytic converter 15 is arranged in exhaust branch 5 downstream from turbine 10, as indicated by a dashed line in FIG. 1. Disposed downstream from catalytic converter 15 in exhaust branch 5 is a second pressure sensor 35, which measures a second pressure p5 of the exhaust gas at this location in exhaust branch 5 and forwards the measuring result to engine control 40.

According to FIG. 1, a particle filter 20 is arranged in exhaust branch 5, downstream from second pressure sensor 35, which in turn is followed by muffler 25 downstream in exhaust branch 5. To be more precise, second pressure p5 represents the pressure drop, increased by ambient pressure pu, that essentially results above particle filter 20. As described, turbine 10 is a first component in exhaust branch 5. Catalytic converter 15 represents a second component, particle filter 20 a third component, and muffler 25 a fourth component in exhaust branch 5. Engine control 40 receives additional input variables 140, which are measured by suitable sensors or are able to be modeled from further performance quantities of internal combustion engine 1. Among these are, for instance, temperature T3 in exhaust branch 5 between the at least one cylinder 55 and turbine 10, and exhaust-mass flow $\dot{m}_{EG}$. Exhaust-gas mass flow $\dot{m}_{EG}$ may be modeled, e.g., as the sum of the fresh air mass flow in the intake manifold and the fuel injection mass flow. Additional variables supplied to engine control 40, for instance requests by vehicle functions such as an anti-lock system, a traction control, vehicle dynamics control, etc., or requests by ancillary components such as the air-condition system, power steering, etc., for the purpose of setting a specific output variable, for instance a specific torque or a particular output of internal combustion engine 1, are not shown further in FIG. 1. Furthermore, in addition to the control variable for turbine 10, engine control 40 generates other output variables 145 to implement the described demands on the output variables of internal combustion engine 1. On the basis of these additional output variables 145 it is possible to suitably control, for instance, the ignition angle and the throttle valve in the case of a spark-ignition engine, and the fuel-injection quantity in the case of a spark-ignition or a diesel engine.

According to the present invention, it is now provided that first pressure sensor 30 and second pressure sensor 35 are subjected to a plausibility check as a function of at least one modeled variable characterizing at least one pressure drop in exhaust branch 5 between first pressure sensor 30 and second pressure sensor 35.

According to a first example embodiment of the present invention, this is done in that a first value for a pressure differential between first pressure sensor 30 and the second pressure sensor 35 in exhaust branch 5 is formed from the difference between first pressure p3 and second pressure p5; a second value for this pressure differential is generated as a function of the at least one modeled variable characterizing at least one pressure drop in the mass-flow line between first pressure sensor 30 and second pressure sensor 35; the first value for the pressure differential is compared to the second value for the pressure differential; and an error is detected if the first value for the pressure differential differs from the second value for the pressure differential by more than a first predefined value S1.

Figure 2:
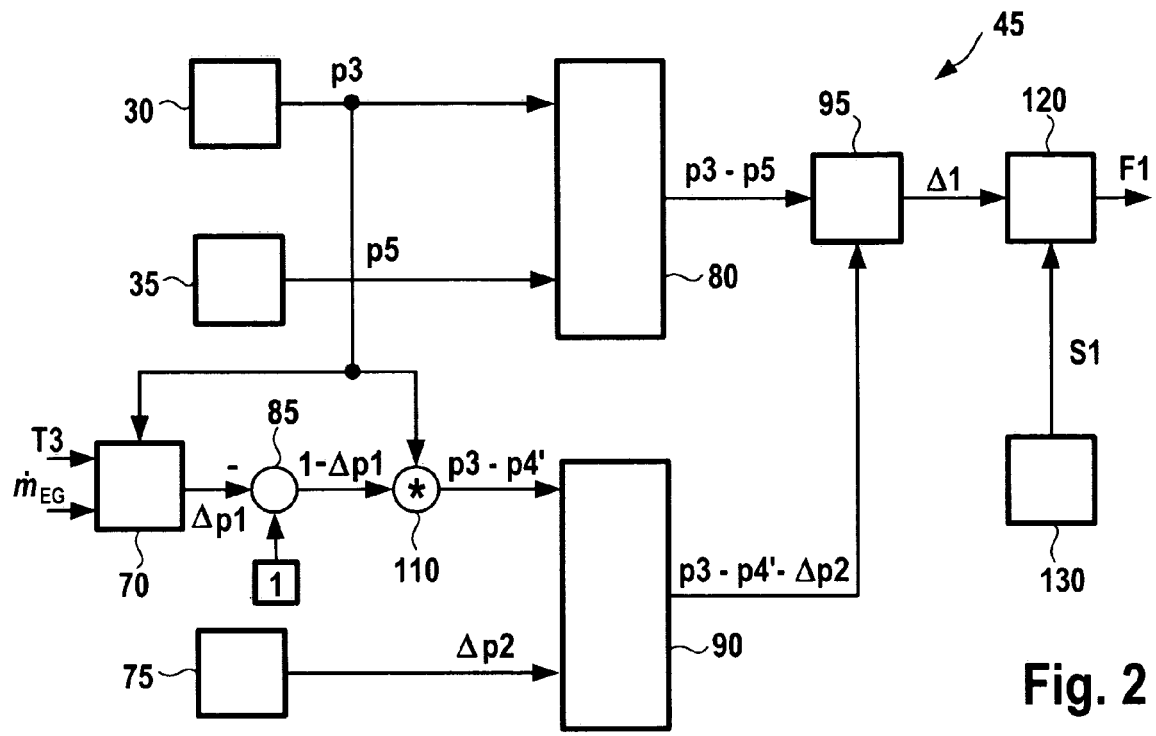
FIG. 2 shows a schematic chart illustrating an example method according to the present invention in connection with an example embodiment of the device of the present invention.

FIG. 2 shows a schematic chart illustrating an example method of operation of an example embodiment of the device of the present invention. The operation illustrated in schematic chart of FIG. 2 represents realization of a first plausibility unit 45. The schematic chart according to FIG. 2 may be implemented in engine control 40 in the form of software and/or hardware. Furthermore, identical reference numerals in FIG. 2 denote elements that are equivalent to those in FIG. 1. For the sake of clarity, FIG. 2 also shows first pressure sensor 30 and second pressure sensor 35, which are not arranged in engine control 40, however. To implement the plausibility check of both pressure sensors 30, 35, first pressure p3 measured by first pressure sensor 30 is forwarded to a first subtraction element 80. Second pressure p5 measured by second pressure sensor 35 is supplied to first subtraction element 80 as well. First subtraction element 80 subtracts second pressure p5 from first pressure p3 and outputs first value p3−p5 for the pressure differential between first pressure sensor 30 and second pressure sensor 35 in exhaust branch 5 at the output. This first value p3−p5 for the pressure differential is forwarded to a fourth subtraction element 95. In addition, a first modeling unit 70 is provided, which models a first variable Δp1 characterizing a first pressure drop in exhaust branch 5 between first pressure sensor 30 and second pressure sensor 35. This first modeled variable Δp1 is also characteristic of the pressure drop above turbine 10. To form this first modeled variable Δp1, first modeling unit 70, too, is provided with first pressure p3 ascertained by first pressure sensor 30, as well as temperature T3 and exhaust-mass flow $\dot{m}_{EG}$. First modeled variable Δp1 results according to the following equation, which represents an approximation solution of the flow equation:

$$\Delta p_1 = \pi_{krit} + \psi_{krit} * \sqrt{1 - \frac{\dot{m}_{EG} * R * T3}{2 * (a_{\it eff} * p3 * \psi_{krit})^2}} \quad (1)$$

Equation (1) thus represents a mathematical model. The equation (1) is also referred to as turbine model since it models a variable that is characteristic of the pressure drop above turbine 10.

$\Psi_{krit} \approx 0.47$ restricts the mass flow directed through turbine 10 at a pressure ratio of $\pi_{krit} \approx 0.53$, and R is the general gas constant. The variables $\pi_{krit}$, $\Psi_{krit}$ and R are stored in engine control 40 and are previously known. Variables $\pi_{krit}$ and $\Psi_{krit}$ describe the characteristics of the turbine that influence the through-flow of the exhaust gas through turbine 10 and are predefined or indicated by the manufacturer of turbine 10, for instance. Variable $a_{\it eff}$ is the effective cross-sectional area of turbine 10. It depends on the control by engine control 40, and thus on the variably adjusted geometry of turbine 10, and may be ascertained on a test stand, for instance, as a function of the operating point, and stored in engine control 40. Depending on the operating point of internal combustion engine 1 at the time when the plausibility check is implemented, the associated effective cross-sectional area $a_{\it eff}$ of turbine 10 will then be taken from a memory assigned to engine control 40. First modeling unit 70 implements the equation (1) and thus forms at its output the first modeled variable Δp1, which is forwarded to a second subtraction element 85. There, it is deducted from value 1, so that the value 1−Δp1 results at the output of second subtraction element 85. This value is supplied to a first multiplication element 110 to which first pressure p3, ascertained by first pressure sensor 30, is simultaneously supplied as well, as additional input variable. The two input variables are multiplied in first multiplication element 110, so that the value p3−p3*Δp1 results at the output of first multiplication element 110. The value p3*Δp1 corresponds to a first value p4' for a third pressure p4 of the exhaust gas between turbine 10 and catalytic converter 15 in exhaust branch 5. Therefore, pressure differential p3−p4' results at the output of first multiplication element 110 above turbine 10 in exhaust branch 5. Pressure differential p3−p4' in turn is the pressure drop that results between first pressure sensor 30 and the point in exhaust branch 5 where third pressure p4 is ascertained. This pressure differential p3−p4' is forwarded to a third subtraction element 90. A second modeling unit 75, which models a second variable Δp2 characterizing a second pressure drop in exhaust branch 5 between first pressure sensor 30 and second pressure sensor 35, is provided in addition. In this example, this second modeled variable Δp2 simultaneously also corresponds to a variable that is characteristic of the pressure drop above catalytic converter 15 in exhaust branch 5.

Second modeled variable Δp2 is modeled by second modeling unit 75 as a function of the operating point. The operating point of combustion engine 1 for all exemplary embodiments of the present invention is to be represented by the engine speed and the load of combustion engine 1, by way of example; the engine speed is ascertained by an rpm sensor, for instance, and is able to be forwarded to engine control 40; the load is able to be ascertained by engine control 40 on the basis of the charge of the at least one cylinder 55 or the supplied fuel quantity or an activation of the driving pedal, for instance. Second modeled variable Δp2 may represent the pressure drop above catalytic converter 15, for instance, and be determined for various operating points of combustion engine 1 on a test stand, for example. Third pressure p4 is measured on the test stand, an empty particle filter being used in exhaust branch 5. Thus, it is assumed that the pressure drop above catalytic converter 15 is equal to the difference between third pressure p4 and ambient pressure pu, which is able to be measured in a conventional manner known in the art. The pressure differentials p4−pu ascertained in this manner are then stored in engine control 40 as well, or in the memory assigned to engine control 40, in association with the particular operating point of combustion engine 1, as individual second modeled variable Δp2. As an alternative, to model second modeled variable Δp2, it is also possible to simply ascertain pressure differential p4−p5 on the test stand for various operating points of combustion engine 1, just as it is possible to model first modeled variable Δp1 by simply measuring the pressure difference p3−p4 for various operating points of the internal combustion engine on a test stand, rather than applying the mathematical model. The modeling of first modeled value Δp1 or the second modeled value Δp2 on a test stand as a function of the operating point may thus lead to the formation of a characteristics map in which first modeled variable Δp1 or second modeled variable Δp2 is stored as a function of the particular operating point, i.e., as a function of the engine speed and the load in this example. This results in a map-controlled modeling of first modeled variable Δp1 or second modeled variable Δp2. The map-based modeling of variable Δp1 is particularly suitable if first component 10 is a component having a rigid geometry, such as a turbine having a fixed geometry, or an oxidation catalyst. When implementing the plausibility check, second modeled variable Δp2 is then also ascertained by second modeling unit 75 as a function of the instantaneous operating point from the memory assigned to engine control 40 and forwarded to third subtraction element 90. Difference p3−p4'−Δp2 of the two input variables is formed in third subtraction element 90 and forwarded to fourth subtraction element 95 as second value for the pressure differential between first pressure sensor 30 and second pressure sensor 35 in exhaust branch 5. Thus, the second value for the pressure differential is dependent on the modeled pressure drop above turbine 10 and on the modeled pressure drop above catalytic converter 15. In fourth subtraction element 95, difference Δ1 of the two input variables of fourth subtraction element 95 is formed. This differential Δ1 thus results as p3−p5−p3+p4'+Δp2=p4'+Δp2−p5. Difference Δ1 is forwarded as input variable to a first comparing member 120 to which first predefined value S1 from a first memory 130 of engine control 40 is supplied as input variable as well. First comparing member 120 compares difference Δ1 with first predefined value S1. If the amount of difference Δ1 is greater than first predefined value S1, first comparing member 120 generates a first error signal F1. This may be done by setting a first error bit. The first error bit may signal an error report, for instance, in an optical and/or acoustic manner. In addition or as an alternative, if a first error bit has been set, engine control 40 is able to initiate an emergency-running measure of internal combustion engine 1 by appropriate control of the ignition and/or the air supply in the case of an Otto engine, or by the injection of fuel in the case of an Otto or diesel engine. As a final consequence, engine control 40 may also switch internal combustion engine 1 off in the presence of a fault.

Figure 3:
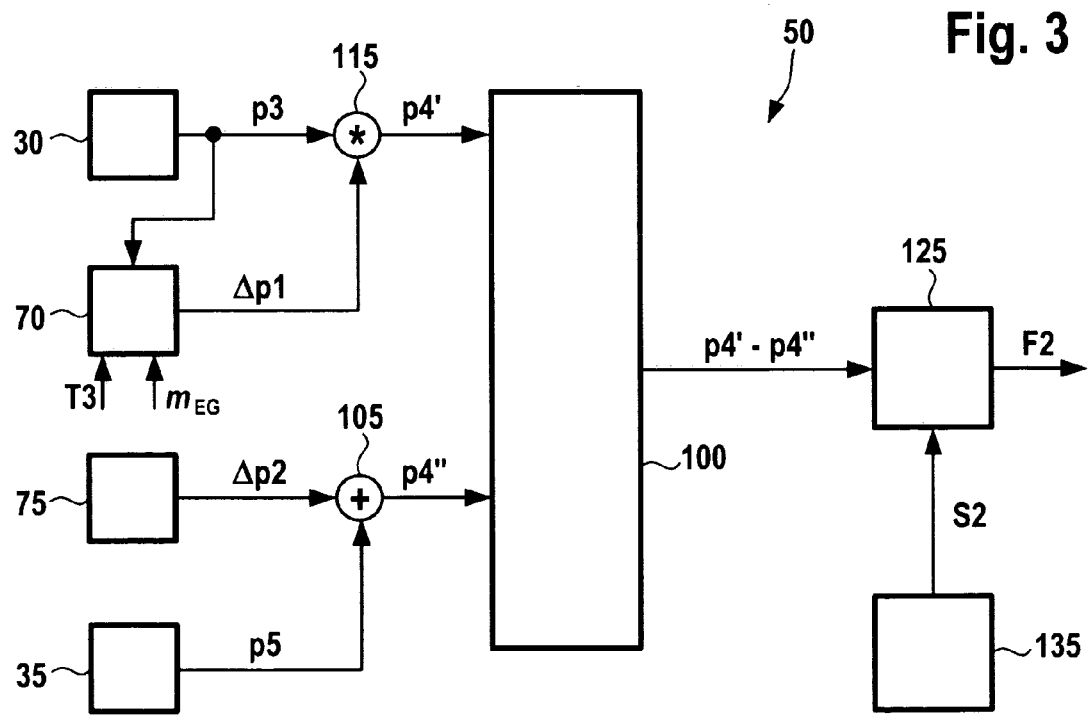
FIG. 3 shows a schematic chart illustrating another example method according to the present invention in connection with another example embodiment of the device of the present invention.

FIG. 3 shows a second schematic chart illustrating another example method and arrangement according to the present invention which may be implemented in engine control 40 in the form of software and/or hardware, with the aid of which method and arrangement the realization of the plausibility check of the present invention may be achieved. This second example embodiment is further simplified compared to the first specific embodiment. In FIG. 3, the same reference numerals again designate the same elements as in the previous figures. According to the second example embodiment shown in FIG. 3, it is once again provided that first value p4' for the third pressure in exhaust branch 5 between turbine 10 and catalytic converter 15 be ascertained on the basis of first pressure p3 and first modeled variable Δp1 which characterizes the pressure drop above turbine 10. Furthermore, on the basis of second pressure p5 and second modeled variable Δp2 representing the pressure drop above catalytic converter 15, a second value p4" for the third pressure in exhaust branch 5 between turbine 10 and catalytic converter 15 is ascertained. First value p4' for the third pressure is then compared to second value p4" for the third pressure. If first value p4' for the third pressure deviates from second value p4" for the third pressure by more than a second predefined value S2, another error will be deemed to have been detected. As in the first example embodiment, the detected error may be caused by faulty pipe-work in exhaust branch 5 between first pressure sensor 30 and second pressure sensor 35, leakage in exhaust branch 5 between first pressure sensor 30 and second pressure sensor 35, or a sensor defect such as sensor drift of first pressure sensor 30 and/or second pressure sensor 35.

The operation and arrangement illustrated in the second schematic chart of FIG. 3 represents realization of a second plausibility unit 50. For the sake of clarity, first pressure sensor 30 and second pressure sensor 35, which are actually not part of engine control 40 and are arranged outside of it, are shown once again. In implementing the plausibility check according to the schematic chart of FIG. 3, first pressure p3 measured by first pressure sensor 30 is forwarded to a second multiplication element 115. Furthermore, the second plausibility unit 50 includes the previously described first modeling unit 70 which, in the manner described in connection with the first example embodiment, forms first modeled variable Δp1 with the aid of the mathematical model according to the previously-described equation (1) as a function of first pressure p3 supplied by first pressure sensor 30, the supplied temperature T3, and the supplied exhaust-mass flow $\dot{m}_{EG}$, which modeled variable Δp1 is then forwarded to second multiplication member 115. As already described for the first example embodiment, first modeled variable Δp1 may also be ascertained in a map-controlled manner. By multiplying first pressure p3 with first modeled variable Δp1, second multiplication element 115 forms first value p4' for the third pressure. This first value p4' for the third pressure is then forwarded to a fifth subtraction element 100. Furthermore, second pressure p5 ascertained by second pressure sensor 35 is forwarded to a summing element 105. The second plausibility unit 50 also includes second modeling unit 75 which has already been described in connection with the first example embodiment, and the second modeled variable Δp2 is ascertained in a map-controlled manner by the modeling unit 75 and is forwarded to summing element 105. Summing element 105 adds second pressure p5 to second modeled variable Δp2, and in doing so, forms second value p4" for the third pressure, and the summing element 105 forwards this second value p4" for the third pressure to fifth subtraction element 100. That is to say, first value p4' for the third pressure is formed on the basis of first pressure p3 and first modeled variable Δp1, and second value p4" is formed on the basis of second pressure p5 and second modeled variable Δp2. In fifth subtraction element 100, difference p4'−p4" between first value p4' for the third pressure and second value p4" for the third pressure is formed. This difference p4'−p4" is supplied to a second comparing member 125 as input variable. As additional input variable, second comparing member 125 is provided with second predefined value S2 from a second memory 135 of engine control 40. Second comparing member 125 checks whether the amount of difference p4'−p4" is higher than second predefined value S2. If the value S2 is exceeded, second comparing unit 125 will generate an error signal F2 which is made up, for instance, of a set second error bit. The setting of the second error bit may once again be accompanied by an optical and/or acoustical signaling of the error. In addition, or as an alternative, engine control 40 may initiate an emergency-running measure of combustion engine 1 in the manner already described for the first example embodiment, and as a final consequence, it may also shut combustion engine 1 down.

First predefined value S1 and second predefined value S2 may be applied in a suitable manner on a test stand, for example, in such a way that tolerances caused by the pressure measurement or the modeling do not lead to the setting of the first error bit or the second error bit in the formation of difference Δ1 or difference p4'−p4". In this manner, if first predefined value S1 or second predefined value S2 is suitably applied, it can be ensured that the first error bit or the second error bit will be set only in the presence of an actual error, for instance due to leakage in the exhaust branch between first pressure sensor 30 and second pressure sensor 35, or faulty pipe-work between first pressure sensor 30 and second pressure sensor 35, or due to undesired sensor drift of first pressure sensor 30 and/or second pressure sensor 35.

It may be provided for both of the above-described example embodiments that the implementation of the described plausibility check takes place only in quasi-stable operating states of combustion engine 1. It may be provided that the plausibility check be carried out only in a predefined working point for which first modeled variable $\Delta p1$ and second modeled variable $\Delta p2$ are also available. To this end, in addition or as an alternative to the variables determining the operating point of combustion engine 1, such as the engine speed and load in this example, the charge pressure may be monitored as well. To determine the operating point of combustion engine 1, it is also possible to utilize the setting of turbine 10, i.e., effective opening-cross section $a_{eff}$ of turbine 10, which, as described, is predefined by engine control 40 as a function of the operating point. A characteristics map which indicates effective cross-section $a_{eff}$ as a function of—in this example—the engine speed and load, may be stored in engine control 40 for this purpose. To provide a quasi-stable operating state of combustion engine 1 for the plausibility check, it is possible to monitor the dynamics of turbine 10, for instance. If the presence of an operating point of combustion engine 1 is detected for which modeled variables $\Delta p1$ and $\Delta p2$ are available and which is detected as quasi-stable operating state because of an only negligible change over time of the geometry of turbine 10, the plausibility check according to the first example embodiment or the second example embodiment may be activated and implemented for a previously set time period. During this time period the triggering of turbine 10 may be kept constant by engine control 40 so as to maintain the quasi-stable operating state. In the event that by the end of the predefined time period the amount of difference $\Delta 1$ exceeds first predefined value S1, or the amount of difference p4'-p4" exceeds second value S2, an error will be detected in the manner previously described. If the predefined time period elapses without detection of an error, no error bit is set. If a condition for the quasi-stable operating state of combustion engine 1 is violated during the predefined time period, for instance because the charge pressure must be increased as a result of a corresponding driver-initiated request and the geometry of turbine 10 thus must be varied so as to ensure a driver-desired acceleration of the vehicle, the plausibility check will be abandoned, and no error bit will be set, i.e., no error will be detected.

The formation of first modeled variable $\Delta p1$ may be implemented in a considerably simplified form when only operating ranges having large effective opening cross-sections $a_{eff}$ of turbine 10 are considered. Due to the then low pressure drop above turbine 10, it is possible to calculate first modeled variable $\Delta p1$ independently of the actual opening of turbine 10. In this case, a fixed value that corresponds to the maximally possible opening cross-section of turbine 10, for instance, may then be used in equation (1) for effective opening cross-section $a_{eff}$ of turbine 10. However, if the plausibility check is to be implemented also for operating points of combustion engine 1 in which effective opening cross-section $a_{eff}$ of turbine 10 is low, effective opening cross-section $a_{eff}$ of turbine 10 assigned to the corresponding operating point must be entered in equation (1) as well, so that the formation of first modeled variable $\Delta p1$ becomes more involved.

In an additional alternative example embodiment, first modeled variable $\Delta p1$ or first value p4' for the third pressure may also be implemented by using the power balance while considering the measured pressures upstream and downstream from compressor 65 in the air supply and upstream from turbine 10 in exhaust branch 5 as well as the individual measured or modeled temperatures downstream or upstream from compressor 65 and upstream from turbine 10.

In the above-described examples it was assumed that catalytic converter 15 is arranged between turbine 10 and particle filter 20. However, this need not be so. The pipework between turbine 10 and particle filter 20 also may be considered a component within the meaning of the present invention, upstream from which a pressure drop results that is taken into account in the manner described by the forming of second modeled variable $\Delta p2$. In this context it may be provided, in particular, that first value p4' and second value p4" for third pressure p4 be ascertained directly downstream from turbine 10, so that the location having third pressure p4 in exhaust branch 5 lies immediately at the output of turbine 10. Accordingly, the formation of first modeled variable $\Delta p1$ also considers the pipe-work between first pressure sensor 30 and turbine 10 in exhaust branch 5, regardless of whether first modeled variable $\Delta p1$ is formed by the mathematical model according to equation (1) or is formed in a map-controlled manner. The pipe-work in exhaust branch 5 between first pressure sensor 30 and turbine 10 also represents a component of exhaust branch 5, upstream from which a pressure drop may—but need not necessarily—occur. In this regard, first modeled variable $\Delta p1$ constitutes a characteristic variable for the pressure drop across a plurality of components of exhaust branch 5, in this example across the pipework between first pressure sensor 30 and turbine 10 as well as upstream from turbine 10. Second modeled variable $\Delta p2$ corresponds to the pressure drop above catalytic converter 15, if provided, and upstream from the pipe-work outside catalytic converter 15, between second pressure sensor 35 and turbine 10; it is possible, but need not be the case, that a pressure drop is present upstream from this pipe-work as well. That is to say, if catalytic converter 15 is present, second modeled variable $\Delta p2$ also corresponds to the pressure drop across several components of exhaust branch 5; otherwise, $\Delta p2$ corresponds to the pressure drop across only one component, i.e., that of the pipe-work between second pressure sensor 35 and turbine 10. Third pressure p4 may also be ascertained at any other point between turbine 10 and second pressure sensor 35; in this case, first modeled variable $\Delta p1$ also characterizes the pipework between turbine 10 and the corresponding location of the pipework having third pressure p4 between turbine 10 and second pressure sensor 35. If catalytic converter 15 is provided, third pressure p4 will be ascertained at a predefined location between catalytic converter 15 and turbine 10.

In the plausibility check of the present invention according to the exemplary embodiments described above, second pressure p5 is ascertained independently of the load state of particle filter 20, particle filter 20 likely not being empty in the plausibility check. As a result, the pressure drop in the form of second pressure p5 essentially coming about above particle filter 20 also will be added in summing element 105 to second modeled variable $\Delta p2$ which corresponds to the pressure drop between second pressure sensor 35 and the point in exhaust branch 5 where third pressure p4 is ascertained.

If exhaust-mass flow $\dot{m}_{EG}$ is measured, a correction of the measured value as a function of the operating point may be implemented, the corresponding correction values being ascertainable on a test stand, for instance, in association with the particular operating point, and storable in engine control 40. This makes it possible to determine exhaust-mass flow $\dot{m}_{EG}$ even more precisely.

The described plausibility check of the two pressure sensors 30, 35 according to the present invention protects components of combustion engine 1 such as the engine, i.e., the at least one cylinder 55 and particle filter 20, and also keeps the exhaust clean. The described plausibility check according to the present invention may also protect turbine 10, in general the exhaust-turbocharger, as additional component. The described plausibility check is able to be implemented during operation of combustion engine 1, and thus is suitable for on-board diagnosis. The described plausibility check may be used both in single-branch and multi-branch exhaust branches. The realization of the plausibility check according to the present invention is not limited to pressure sensors in exhaust branches having components arranged in-between, but in a corresponding manner may generally be applied to pressure sensors in mass-flow lines having interposed components, for instance also in the air supply of the combustion engine. Here, it is possible to provide, for instance, a throttle valve and compressor 65 as components, and an intake-manifold pressure sensor downstream from the throttle valve and a pressure sensor upstream from compressor 65 as pressure sensors. The described method according to the present invention and the described device of the present invention for checking the two pressure sensors 30, 35 for plausibility are also not limited to the use of specific types of pressure sensors, but may be used as described to measure first pressure p3 and to measure second pressure p5, to this end utilizing differential-pressure sensors, absolute pressure sensors and/or relative pressure sensors. The type of pressure measurement, per se, is not critical.

What is claimed is:

1. A system for operating a combustion engine having a mass-flow line and at least one component effecting a pressure drop in the mass-flow line, comprising:
   a first pressure sensor provided upstream from the at least one component, wherein the first pressure sensor measures a first pressure upstream from the at least one component;
   a second pressure sensor provided downstream from the at least one component, wherein the second pressure sensor measures a second pressure downstream from the at least one component;
   a plausibility unit for checking plausibility of measurements made by the first pressure sensor and the second pressure sensor, as a function of at least one modeled variable characterizing at least one pressure drop in the mass-flow line between the first pressure sensor and the second pressure sensor.

2. A method for operating a combustion engine having a mass-flow line and at least one component effecting a pressure drop in the mass-flow line, comprising:
   measuring a first pressure upstream from the at least one component by a first pressure sensor;
   measuring a second pressure downstream from the at least one component by a second pressure sensor; and
   checking for plausibility of measurements made by the first pressure sensor and the second pressure sensor, as a function of at least one modeled variable characterizing at least one pressure drop in the mass-flow line between the first pressure sensor and the second pressure sensor.

3. The method as recited in claim 2, further comprising:
   obtaining a first value of a pressure differential between the first pressure sensor and the second pressure sensor in the mass-flow line from the difference between the first pressure and the second pressure;
   obtaining a second value of a pressure differential between the first pressure sensor and the second pressure sensor in the mass-flow line as a function of the at least one modeled variable characterizing at least one pressure drop in the mass-flow line between the first pressure sensor and the second pressure sensor;
   comparing the first value of the pressure differential to the second value of the pressure differential; and
   detecting an error if the first value of the pressure differential deviates from the second value of the pressure differential by more than a first predefined value.

4. The method as recited in claim 3, wherein the at least one modeled variable characterizing at least one pressure drop in the mass-flow line between the first pressure sensor and the second pressure sensor is one of: a) obtained by using a mathematical model; and b) obtained in a map-controlled manner.

5. The method as recited in claim 3, wherein the at least one modeled variable characterizing at least one pressure drop in the mass-flow line between the first pressure sensor and the second pressure sensor is obtained as a function of an operating point of the combustion engine.

6. The method as recited in claim 3, wherein the checking for plausibility of measurements is implemented only in quasi-stable operating states of the combustion engine.

7. The method as recited in claim 3, wherein the checking for plausibility of measurements is implemented within a predefined time.

8. The method as recited in claim 2, further comprising:
   obtaining a first value of a third pressure in the mass-flow line between the first pressure sensor and the second pressure sensor on the basis of the first pressure and a first modeled variable characterizing a first pressure drop in the mass-flow line between the first pressure sensor and the second pressure sensor;
   obtaining a second value of the third pressure in the mass-flow line between the first pressure sensor and the second pressure sensor on the basis of the second pressure and a second modeled variable characterizing a second pressure drop in the mass-flow line between the first pressure sensor and the second pressure sensor;
   comparing the first value of the third pressure with the second value of the third pressure; and
   detecting an error if the first value of the third pressure deviates from the second value of the third pressure by more than a second predefined value.

9. The method as recited in claim 8, wherein:
   a plurality of components are arranged in the mass-flow line between the first pressure sensor and the second pressure sensor;
   the first modeled variable characterizing the first pressure drop in the mass-flow line between the first pressure sensor and the second pressure sensor is characteristic of a pressure drop above at least one component between the first pressure sensor and the point in the mass-flow line where the third pressure is obtained; and
   the second modeled variable characterizing the second pressure drop in the mass-flow line between the first pressure sensor and the second pressure sensor is characteristic of a pressure drop above at least one component between the second pressure sensor and the point in the mass-flow line where the third pressure is obtained.

10. The method as recited in claim 8, wherein the checking for plausibility of measurements is implemented only in quasi-stable operating states of the combustion engine.

11. The method as recited in claim 8, wherein the checking for plausibility of measurements is implemented within a predefined time.

12. The method as recited in claim 2, wherein a plurality of components are arranged in the mass-flow line between the first pressure sensor and the second pressure sensor, and wherein the at least one modeled variable characterizing at least one pressure drop in the mass-flow line between the first pressure sensor and the second pressure sensor is characteristic of a pressure drop above at least one of the plurality of components arranged in the mass-flow line between the first pressure sensor and the second pressure sensor.

13. The method as recited in claim 12, wherein the checking for plausibility of measurements is implemented only in quasi-stable operating states of the combustion engine.

14. The method as recited in claim 12, wherein the checking for plausibility of measurements is implemented within a predefined time.

15. The method as recited in claim 2, wherein the checking for plausibility of measurements is implemented only in quasi-stable operating states of the combustion engine.

16. The method as recited in claim 2, wherein the checking for plausibility of measurements is implemented within a predefined time.

* * * * *